March 17, 1970     A. L. PUTNAM     3,500,574
FISHING FLIES, LURES AND NYMPHS
Filed Feb. 12, 1968     3 Sheets-Sheet 1
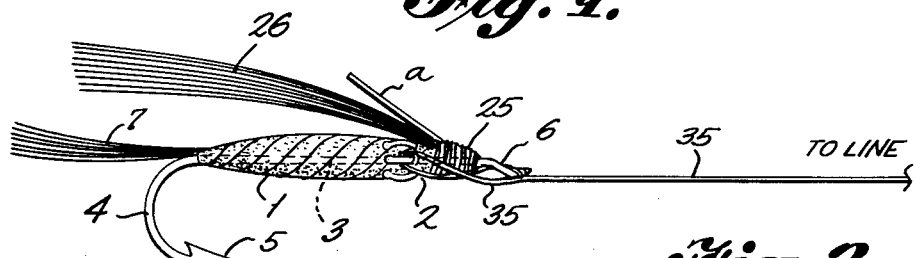
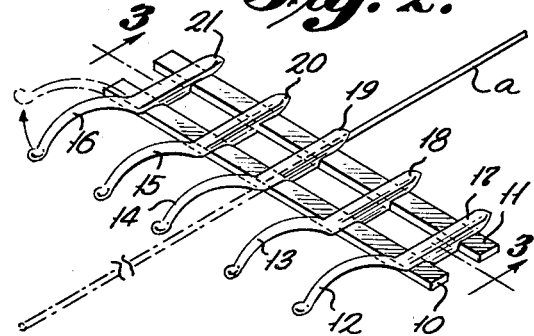
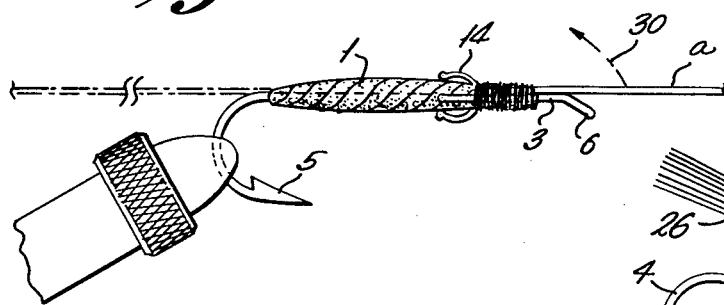
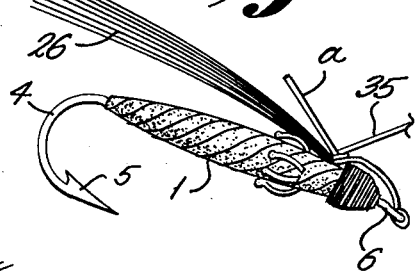
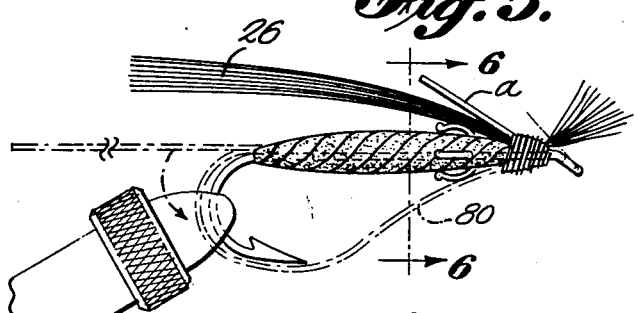
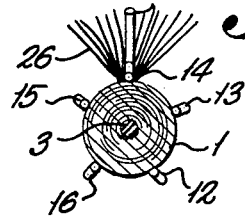
INVENTOR
Alben L. Putnam
BY Carl T. Mack
ATTORNEY

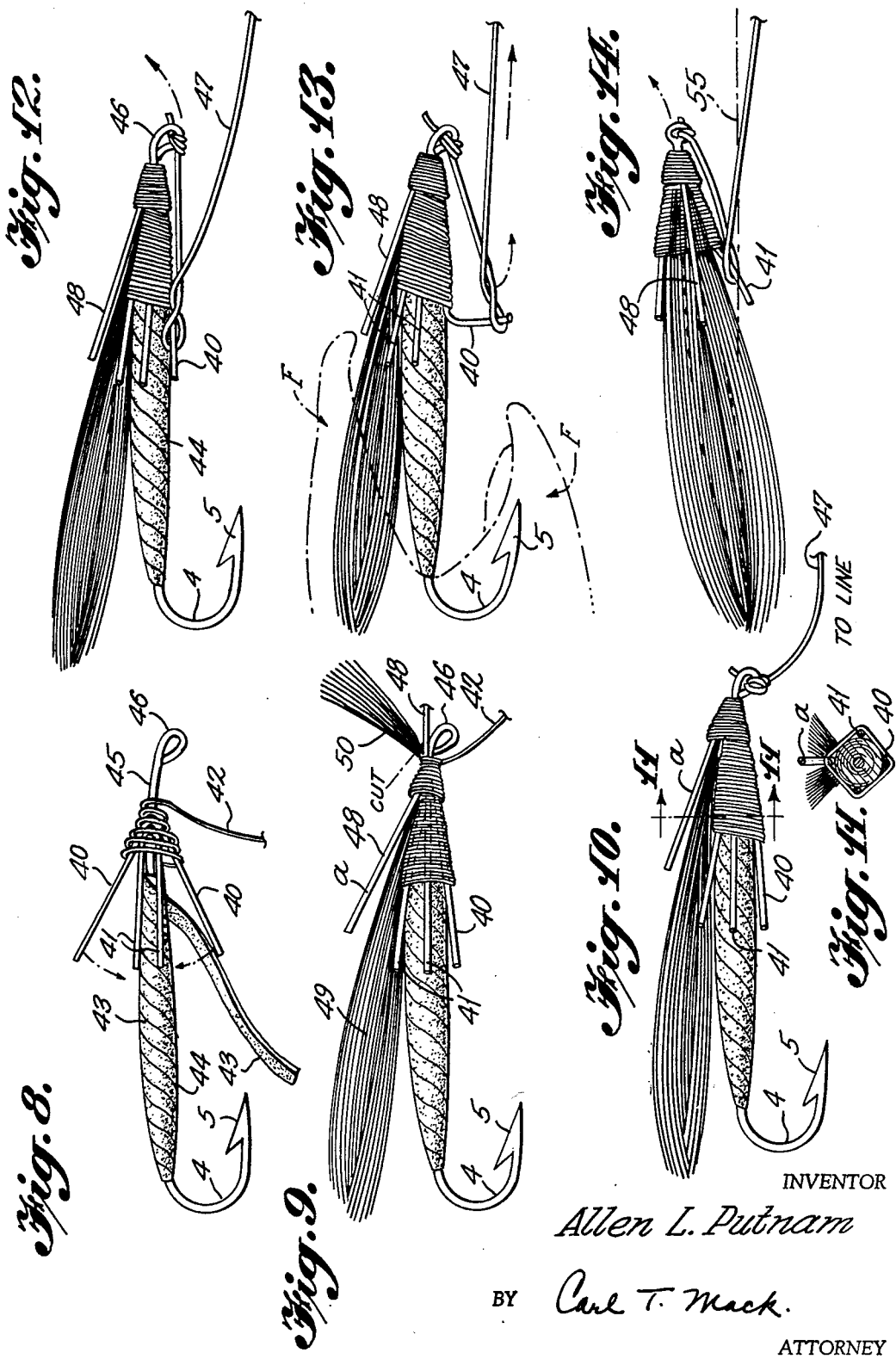

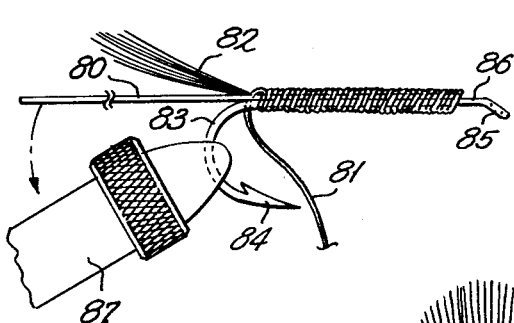
Fig. 15.
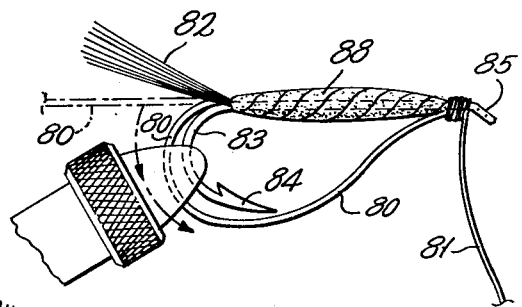
Fig. 16.
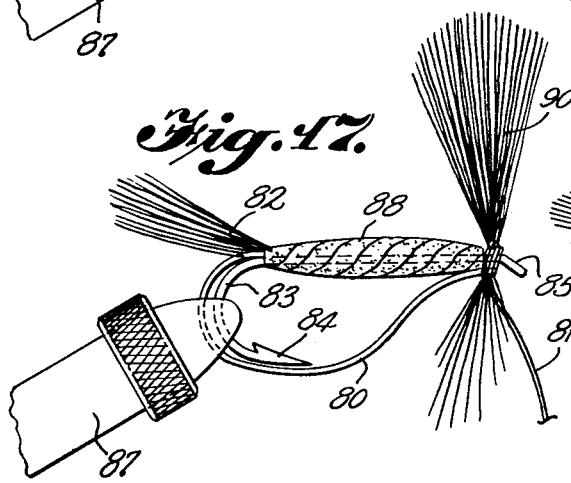
Fig. 17.
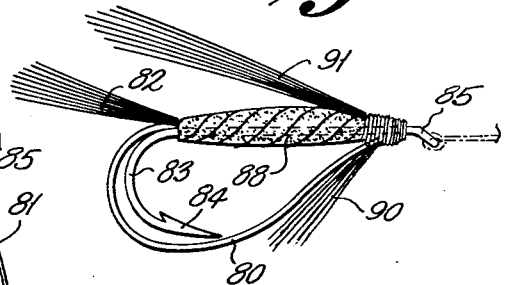
Fig. 18.
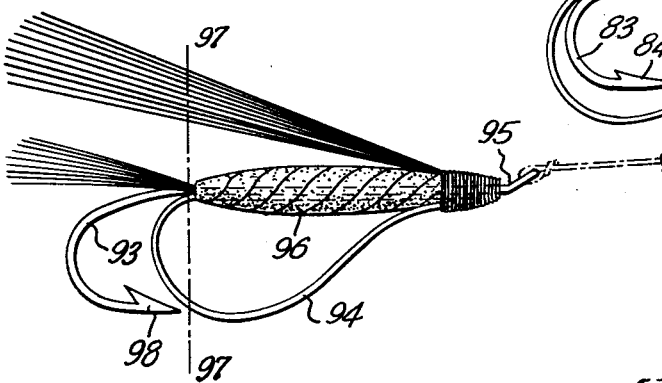
Fig. 19.
Fig. 20.

United States Patent Office 3,500,574
Patented Mar. 17, 1970

3,500,574
FISHING FLIES, LURES AND NYMPHS
Allen Lewis Putnam, Fullerton, Calif., assignor of one-third each to Allen Putnam, Leland C. Launer, and Mark L. Kerridge, all of Fullerton, Calif.
Filed Feb. 12, 1968, Ser. No. 704,657
Int. Cl. A01k 85/08
U.S. Cl. 43—42.25                11 Claims

ABSTRACT OF THE DISCLOSURE

A fishing fly comprising a hook having a shank, an eye and a barbed point, a fly body and head formed on the shank between the eye and the barbed point and an attaching means for a leader mounted between the head and the body. The attaching means comprises a group of tension closed clips in an assembly made of non-absorbent, semi-flexible plastic material which is wrapped around the hook shank with the clips facing rearwardly and lashed thereto by thread. A leader is tied to the hook eye and by means of a half-hitch is hooked around one of the clips providing leverage on the fly and causing erratic movement of the fly in water.

---

This invention relates to fishing flies, lures and nymphs and the like and has basically, for its object, the production of a simple method of making lures that will permit most anglers to create an exact imitation of the insect in question.

The inventor, being in that category of fishermen known as purists, has developed a most unusual and novel concept relating to fly fishing for grame fish in the fresh waters to be found throughout civilized countries as we know them today. Essentially, the concept accomplishes two rather distinct objectives, by means of one technique, with variations.

The first objective is termed by the inventor the "Brush-Off," which is a very simple means of avoiding snagging of the lurge, accomplished by employing a monofiliament loop encircling the hook. The second objective is termed by the inventor the "Actions-Fly" which is a means of bringing about erratic fly movement in the water, when properly fished, accomplished by looping the line over one of the monofilament stubs provided near the head of the fly, which, when manipulated properly, drags the fly from a point other than the edge of the hook.

The invention has, in producing his novel lure, employed standard materials and methods or he may employ a plastic device which incorporates the clips and loops hereinafter described, to be part of the fly which is to be wrapped and tied in traditional manner. The tying of flies has been a fascinating avocation for fishermen but in commercial ventures, most of the fly tying is accomplished today by ladies who become very adept at tying the many fly patterns employed.

"ACTIONS-FLY"

This name, for the purpose of better disclosing the invention is applied to an attachment on fishing hooks such as used with artificial flies, to impart to the finished fly action and direction, differing from the action and direction associated with the fly when fished in the normal manner from the eye thereof. The "Actions-Fly" is to simulate a wounded minnow turning on its side or swimming in an impaired manner, thus adding an upward, downward or across-current movement to the streamer, wet or dry fly patterns.

The customary leader which is fastened to the fishing line and to the eye of the fly hook becomes frayed and cut when used, even in normal casting and fishing, when too much presssure is exerted on the fly and leader, to say nothing of the cutting action which is associated with the leader when the normal casting and fishing pressures are exceeded. Hence, the "Actions-Fly" construction herein employed is also designed to narrow down and protect damage to the fishing leader.

"ACTIONS-FLY" AND MANUFACTURED CLIPS

The fundamental purposes in employing a manufactured clip is the same as that in employing standard tying materials, since in both instances clips or their equivalents are employed. When the leader is secured to the fly, each position of the clip will provide a different leverage and, therefore, action on the fly. The so-called manufactured clip is shown in FIGURES 1-7 of the accompanying drawings, the clip in the form of a manufactured product being shown in FIGURES 2 and 3. When employing a manufactured clip, the fisherman will experience controlled tension and flexibility of the clips. The fisherman will experience maximum protection against the leader cutting itself; a reduction of damage by the leader to the fly's body, and the fly tier will experience a greater ease in the building of the fly and in the spacing of the clips. The clip provides a tension-closed clip somewhat like the clasp on a fountain pen, thus preventing the leader from falling out from under the clip.

Reference is to be had to the accompanying drawings forming a part of this specification, in which similar characters of reference indicate corresponding parts in all the views.

FIGURE 1 shows the partially completed body of a streamer fly; FIGURE 2 shows the manufactured clip assembly; FIGURE 3 is a cross-sectional view taken on line 3—3 of FIGURE 2; FIGURES 4 through 7 depict various steps in tying a fly embodying the invention; FIGURES 8, 9, 10, 11, 12, 13 and 14 show "Action-Fly" flies and lures being fabricated from standard monofilament fibers; FIGURES 15, 16, 17, 18, 19 and 20 show the "Brush-Off" designs forming a part of this invention.

By following in detail FIGURES 1 through 7, the uniqueness of this invention will emerge. The art of fly tying seems relatively simple to a few persons but to many, especially those who are not fishermen, the art might be most uninteresting. Hence, it is difficult to comprehend at a glance just what is taking place in FIGURES 1-7.

Starting with FIGURE 1 there is shown the partially completed body 1 of a streamer fly constructed by a time-honored method by one versed in fly making. The body has not been completed to the head of the fly, terminating in the vicinity of area 2. The body is constructed around the shank 3 of a hook 4 which terminates in a barb 5 and an eye 6. The traditional buck-tail 7 is worked into the streamer body as tying progresses, the body material being substantially yarn and tinsel and secured to the shank 3 of the hook in the usual manner. When the body has reached the point 2, the shank of the hook between point 2 and eye 6 is ready to receive the manufactured clip assembly, shown greatly enlarged in FIGURE 2. The clip assembly is made of non-absorbent, semi-flexible plastic material, the assembly taking the form shown in FIGURES 2 and 3, FIGURE 3 being a cross-sectional view taken on line 3—3 of FIGURE 2. Commercially, a rather substantial market should exist, both for flies incorporating the clip assembly during the fly-tying step and for sales of the plastic device as a product, as shown in FIGURES 2 and 3, and made available to those who would tie their own flies.

The clip structure of FIGURES 2 and 3 can be made in suitable lengths and severed later to be tailored to the pattern of the fly being wrapped. The spacer members 10 and 11 are flat and thin and in the instance of FIGURE 2 have been cut from a length of clip structure to form a unit of five connector clips, designated 12–16 which are integral with portions 17–21, respectively said portions bridging the spacer members as shown and being equally spaced from each other. The unit of five connector members is adapted to be wrapped around the shank portion 3 of the hook and the portion 19 of the unit will overlie the monofilament fiber a, (see FIGURE 2), such monofilament being shown in FIGURES 1–7 to serve a purpose later to be described.

The portions 17–21, as pointed out, are wrapped around the hook shank in the region 2 between the fly's body and head, and are placed in contact with the hook shank and lashed thereto by the tying thread, the clips 12, 13, 14, 15 and 16 facing toward the rear of the fly's body while the monofilament fiber a is in overlying position with the hook shank and extends beyond both ends of the fly as seen in FIGURE 4, the tying thread being applied as shown. The tying progresses until portions 17, 18, 19, 20 and 21 are embedded in the head 25 of the fly (FIGURE 1) and at the same time the wings 26 of the fly are secured in the head of the fly. The construction of the fly for the most part follows accepted practice in this art and forms no part of this invention but when the application of the clip structure to a fly being tied enters the picture, then this invention begins to take form.

Returning to FIGURE 1, it will be seen that this is a fairly accurate showing of the inventor's "Actions-Fly" lure. There is shown the top-forward straight clip a which has been bent backward to form the clip, the monofilament a of FIGURE 4 have been moved backward in the direction indicated by arrow 30. In addition to this straight clip a there are four curved clips 12, 13, 15 and 16 in the situation where an "Actions-Fly" fly is being manufactured; and five curved clips when a "Brush-Off" fly is being tied; the cross-sectional view of FIGURE 6 showing such. FIGURE 6 shows the straight clip a, and five curved clips 12, 13, 14, 15 and 16. It is preferable to manufacture the curved connector clips 12–16 so that their respective clip ends and the clip butts are on the same plane, as seen in FIGURE 2, thus affording an opportunity for the clip ends to engage the fly body in much the same manner as the clip on a fountain pen cap engages the cap. The portions 17–21 are half-round in cross-section with concave back portions; the spacer connector members 10 and 11 are substantially thin in comparison to the portions 17–21.

Referring again to FIGURE 1, there is depicted 'Actions-Fly" fly, about to be attached to a leader 35. The leader, at one end, is secured to the fishing line (not shown) by one of many traditional knots known to fishermen. The other end of the leader is tied to the eye of the hook but only for securement purposes. Orinarily, the leader would be tied to the eye of the hook and the fly or lure would be fished by manipulation of the leader. But under the conditions here prevailing, the leader now plays a more important part in the fishing of the fly than ever before. The leader 35 is first tied to the eye of the hook and then by means of a half-hitch, the attachment is made around one of the clips or by simply running the leader behind the clip. From here on the uniqueness of the Actions-Fly" disclosure becomes clear. When the leader s pulling the fly from an "Actions-Fly" clip, leverage is exerted on the fly causing the unique motion. Using a half-hitch leader attachment, a top clip will provide a downward movement; a bottom clip an upward movement; a side clip an outward movement of the fly. If the bottom clip is positioned about one-third the body length from the eye, a sharp pull on the leader provides an upsetting movement on the fly, turning it on its side. These are merely descriptive of several typical movements achieved by "Actions-Fly" and are not limiting in their nature, Any fisherman knows that the most desirable alignment of the fly while playing a fish would be that where the leader is attached to the eye of the hook and the strength of the leader would be depended upon.

The clip, therefore, is of sufficient strength to hold its position from the force exerted in casting and fishing in a normal manner. When extra pressure that would be harmful to the leader is applied from a hooked fish or a snagged hook, the clip is sufficiently weak and flexible to collapse and release the leader, placing the leader back to its normal position. In this way, the best alignment of the leader attached to only the eye of the hook, as well as the strongest connection is achieved.

"ACTIONS-FLY" AND STANDARD MATERIALS

Departing from the tailored clips structure for a time, attention is invited to FIGURES 8, 9, 10, 11, 12, 13 and 14, in which "Actions-Fly" flies and lures are fabricated from standard monofilament fibers.

FIGURE 8 represents a streamer fly employing five nylon prongs or five monofilament prongs, the tying method proceeding substantially as follows: 40, 40 represent an untreated monofilament fiber bent double to form top and bottom "Actions-Fly" clips or prongs; 41, 41 represent an untreated monofilament fiber bent double to form the right and left side "Actions-Fly" clips or prongs. The tying thread to lash or tie these prongs to the fly body 44 and to the hook shank 45 is indicated at 42. The fly body cover 43 is made of tinsel and wrapped on base materials to form a streamer fly body, all of which is old in the art. The hook 4 and its shank 45 are incorporated into the fly body in the conventional manner, but the fly body does not extend completely to the eye 46, the portion of the shank between the fly body and the eye being reserved for the following:

The wrapping of the tying thread 24 stops (FIGURE 9) where the prongs give evidence of being capable of holding a fishing leader 47. Holding the body material 43 at this point the tying thread 42 is wrapped about the prongs 40 and 41 until the prongs are drawn down to the fly body, not completely, but enough to make a prong or clip, substantially as shown in FIGURE 9. At this time a single monofilament fiber 48 is tied on top of the wing 49, the purpose being to form a fifth prong or clip, behind the head of the fly and on the top of the fly. The forward dressing 50 and the monofilament material together with the excess wing dressing are clipped off to produce an almost finished "Actions-Fly" fly. The head of the fly is finished off with the tying thread 42, thus forming a completed head, having now the appearance of the fly shown in FIGURE 9. As depicted in FIGURE 10, the leader is secured to the eye of the hook, the other end of the leader after performing several stints of duty, leading to the fishing line.

FIGURE 11 depicts a cross-section taken on the line 11—11 of FIGURE 10, the elements thereof being suitably identified. Thus we are brought to FIGURE 12 where the stints of duty above referred to are depicted, not only in FIGURE 12 but in FIGURES 13 and 14.

Referring to FIGURE 12, the leader 47 is first tied to the eye 46 of the hook and then by employing a half-hitch can be placed over anyone of the fiber clips or prongs 40, 41 or 48. There is shown in FIGURE 13 a rough outline of the head of a fish F, its mouth being open and about to gorge itself on the lure. The leader 47, half-hitched about prong 40, responds to the pressure placed upon it and gradually the prong will yield. In so doing, it becomes apparent that the position of the clip will provide a different leverage and therefore action on the fly. The showing in FIGURE 13 teaches also that when the pressure on the leader 47 (the fish F having been caught) becomes excessive, it will overcome the tension of the prong 40 and the leader will be released, to be on its own, so to speak, since it is secured to the eye 46 of the hook, FIGURE 14 is a plan views of the "Actions-Fly" shown in FIGURE 8. It is to be noted that the off-set of the fly body with reference to the center-line 55 is due to the side pull leverage when the leader is half-hitched to the bottom prong or clip 40.

It is to be understood that many minor details of tying these flies and of incorporating thereinto the devices forming a part of this invention have not been elaborated upon since they are well known to expert fly tyers and to some extent to novices and "do it yourself" types of fly tyers. We come now to the "Brush-Off" designs previously referred to and depicted in FIGURES 5, 15, 16, 17, 18, 19 and 20.

"Brush-Off" is the name given by the inventor to the design he has developed to make fishing hooks used with artificial flies, snag and foul resistant. Fish hooks so equipped would have protection against snagging into and becoming fouled or damaged by rocks, limbs, brush, trees, weeds, sea-weed and debris above, on or below the water's surface. Also, it will prevent long bucktail, polar bear hair and hackles used on streamer flies from lodging beneath the hook.

"Brush-Off" is believed to be unique and original in design. The design is obtained when a "loop" of flexible line or fiber, such as monofilament line or leader, horsehair, etc., is attached to the shank of the fishing hook. This "loop" is in alignment with the curve of the hook with at least one fiber passing in front of the hook's point. The flexible line or fiber will exit and enter on the hook's shank at different points, never at the same place. The position on the shank, that the flexible line or fiber will exit and enter, can be changed for adapting to different sizes and types of hooks. Typical elements and method steps for making "Brush-Off" are illustrated herein.

The "loop" is the essential feature of the "Brush-Off." The "loop" supports and positions the flexible line or fiber. As a result, sufficiently light weight or small diameter flexible line or fiber can be used for adaptation to dry, wet, nymph and streamer flies of all sizes. Therefore, there is no significant weight to alter effective flotation of the dry fly, wind resistance to hamper casting, water resistance to alter the action of the underwater flies and it is least visible to the fish. By a combination of altering the size of the "loop," and the diameter or weight of the flexible line forming the "loop," the "Brush-Off" structure can be adapted to any size or type artificial fly without significantly resisting a fish's strike. The "loop" is also essential to give "Brush-Off" resiliency to regain its original shape and position time after time. "Brush-Off" will not significantly resist the strike and impair full hooking of the fish when applied correctly to the size and type of fly. Any fly fisherman knows that he has lost fish when he discovered the hook-point had been damaged on a rock; or that he had fished through a lot of fine water with a fouled fly; to say nothing of the time lost in unsnagging or defouling the fly. The structure termed "Brush-Off" is believed to lend a new dimension to fly fishing for all devotees of the art.

Reverting once again to FIGURE 5 it will be seen that the "Brush-Off" fiber 80, shown in dotted outline may readily be combined with an "Actions-Fly" structure by simply working the fiber into the fly during the tying operation.

FIGURES 15, 16, 17 and 18 depict the tying of a "Brush-Off" structure upon a typical 2x long hook. FIGURE 15 shows an untreated monofilament 80 being laid upon the top of a shank 86 of a fish hook 83, the monofilament being laid to a point where the fly's body would ultimately end, proceeding toward the head of the fly. The tying thread 81 is used to secure the monofilament to the top of the shank 86. The fly's tail 82 is inserted after the monofilament is attached. During this operation, the beginning of the "Brush-Off" structure is mounted in the tying vise 87.

FIGURE 16 depicts the next step wherein the body of the fly 88 is formed in a manner familiar to those skilled in the art. It is to be noted that the monofilament 80 is now passed between the vise jaws, bent to conform to the outer periphery of the hook 83 and brought forward and attached to the shank of the hook closely adjacent to the eye 85 of the hook by further wrapping wtih the tying material 81. To obtain the desired tear-drop "Brush-Off" shape, a pull should be applied to 80 before it is tied into the head of the fly with the tying thread. FIGURE 17 depicts the fly with hackles 90 added and FIGURE 18 depicts the "Brush-Off" fly in just about its ideal form; a tear-drop curve to the monofilament; and tail feathers, hackles and wings 91 worked into the body.

FIGURE 20 depicts the ideal tear-drop shape in order to maintain alignment and give the greatest protection to the hook with the smallest size or gauge of monofilament 80. It should be noted that in FIGURE 20, the monofilament is attached to the fly body in a manner differing slightly from FIGURE 18. (Note the portion 92.) It is therefore a modification of FIGURE 18.

Lastly, there is depicted in FIGURE 19 another modification of the "Brush-Off" design. This modification relates to a hook now popular with fishermen who fish for Steelhead trout and it has proven to be the best wet fly design embodying my invention. The hook 93 is known as "Mustad" #36890 and the style of tying the fly is preferred by fly tyers since it is effective and easiest to tie. There is a tying difference as contrasted to other forms shown in that the monofilament 94 is fixed to the underside rather than the top side of the hook's shank 95 and the fly body 96 on shank 95 ends near or at the line 97—97, thus bringing it in line with the point 98 of the hook. This arrangement brings about a different orientation of the loop 94 with respect to the hook point 98.

I wish it distinctly understood that my methods for forming lures herein illustrated and described show the steps performed in carrying out my methods, all are shown and described in the various forms in which I desire to construct them, and that changes or variations may be made as may be desirable or convenient without departing from the salient features of my inventions.

What is claimed is:

1. A fishing fly comprising a hook having a shank, an eye and barbed point, a fly body and head formed on the shank between the eye and the barbed point, attaching means for a fishing leader mounted between said body and said head comprising a group of semi-flexible clips, each clip providing a leader attaching means, said clips extending from their positions behind said head to points substantially half-way down the length of the fly's body, each position of each leader attaching clip when the leader is attached thereto providing a different leverage and therefore a different action on the fly when fished.

2. A fishing fly as described in claim 1 in which said clips are tension-closed clips.

3. A fishing fly as described in claim 2 in which each of said clips has sufficient strength to hold its position from the force exerted upon it in casting and fishing in a normal manner but having insufficient strength when extra pressure is applied to said leader, whereby said clip is sufficiently weak and flexible to collapse and release the leader to its normal position.

4. A fishing fly as described in claim 1 in which said leader attaching means comprises a manufactured clip assembly consisting of non-absorbent semi-flexible plastic material.

5. A fishing fly as described in claim 4 in which portions of said manufactured clip assembly are wrapped around said hook shank in the region where said fly body terminates and said fly head begins.

6. A fishing fly as described in claim 4 in which the clips of said manufactured clip assembly face toward the rear of the fly body.

7. A fishing fly as described in claim 6 having a monofilament fiber in overlying position with said hook shank and extending beyond both ends of said fly.

8. A fishing fly as described in claim 7 in which the portion of the overlying monofilament fiber that extends beyond the fly body nearest the eye portion of said hook shank is bent backwardly to form a leader attaching means separate and apart from the clips comprising said clip assembly.

9. A fishing fly as described in claim 1 in which said leader attaching means consists of non-absorbent and semi-flexible plastic material which is made in suitable lengths and severed later to be tailored to the pattern of the fly being wrapped.

10. A fishing fly as described in claim 9 in which each length of plastic material consists of spacer members which are flat and thin and to which are integrally attached in spaced formation five connector clips and their complementary wrapping portions which are wrapped around said hook shank and lashed thereto, said clips facing toward the rear of said fly's body.

11. A fishing fly as described in claim 10 in which the respective clip ends and the clip butts are in the same plane, thus affording an opportunity for the clip ends to grasp the fly body due to the springing action inherent in said clips.

References Cited

UNITED STATES PATENTS

| | | | |
|---|---|---|---|
| 975,833 | 11/1910 | Cox | 43—42.25 X |
| 1,657,734 | 1/1928 | Wright et al. | 43—42.25 |
| 2,696,693 | 12/1954 | Markquart | 43—42.28 |

SAMUEL KOREN, Primary Examiner

D. J. LEACH, Assistant Examiner

U.S. Cl. X.R.

43—42.28, 42.49, 42.53